United States Patent
Milman et al.

(10) Patent No.: US 9,336,400 B2
(45) Date of Patent: *May 10, 2016

(54) INFORMATION ASSET PLACER

(71) Applicant: International Business Machines Corporation, Armonk, NY (US)

(72) Inventors: Ivan M. Milman, Austin, TX (US); Martin Oberhofer, Bondorf (DE); Sushain Pandit, Austin, TX (US); Calvin S. Powers, Chapel Hill, NC (US); Wayne Tackabury, West Tisbury, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,490

(22) Filed: Sep. 8, 2014

(65) Prior Publication Data

US 2015/0304169 A1   Oct. 22, 2015

Related U.S. Application Data

(63) Continuation of application No. 14/257,422, filed on Apr. 21, 2014.

(51) Int. Cl.
*H04L 29/06* (2006.01)
*G06F 21/60* (2013.01)
*H04L 12/24* (2006.01)

(52) U.S. Cl.
CPC .............. *G06F 21/60* (2013.01); *H04L 41/046* (2013.01); *H04L 41/0823* (2013.01)

(58) Field of Classification Search
CPC ...................................................... G06F 21/60
See application file for complete search history.

(56) References Cited

U.S. PATENT DOCUMENTS

| | | | |
|---|---|---|---|
| 7,005,985 B1 | 2/2006 | Steeves | |
| 8,200,818 B2 | 6/2012 | Freund et al. | |
| 2005/0131825 A1 | 6/2005 | Vijay | |
| 2006/0090206 A1 | 4/2006 | Ladner et al. | |
| 2007/0162550 A1* | 7/2007 | Rosenberg ............ | H04L 12/581 709/206 |
| 2010/0114634 A1 | 5/2010 | Christiansen et al. | |
| 2015/0033305 A1 | 1/2015 | Shear et al. | |
| 2015/0044651 A1* | 2/2015 | Thomas ................. | G09B 19/00 434/247 |
| 2015/0052614 A1 | 2/2015 | Crowell et al. | |

OTHER PUBLICATIONS

Foster et al., "Software Infrastructure for the I-WAY High-Performance Distributed Computing Experiment", IEEE, 1996, pp. 562-571.

(Continued)

*Primary Examiner* — Shawnchoy Rahman
(74) *Attorney, Agent, or Firm* — David B. Woycechowsky (57) ABSTRACT

A computer-implemented method for the placing of information assets, including: discovering information about a new or changed information asset; determining one or more characteristics of an ideal location for the information asset; determining one or more characteristics of one or more locations in an information technology environment; determining the compatibility of the information asset with the location(s) by comparing the characteristic(s) of the ideal location to the characteristic(s) of the actual location(s); reporting the compatibility to a user; and optionally suggesting alternative placement locations. The locations may be part of one or more locational schemas.

6 Claims, 7 Drawing Sheets

(56) References Cited

OTHER PUBLICATIONS

Karnouskos et al., "A SOA-based architecture for empowering future collaborative cloud-based industrial automation", IEEE, 2012, pp. 5766-5772.

U.S. Appl. No. 14/257,422, entitled "Information Asset Placer", filed Apr. 21, 2014.
Appendix P—List of IBM Patents or Patent Applications Treated As Related.

* cited by examiner

INFORMATION ASSET PLACER

FIELD OF THE INVENTION

The present invention relates generally to the field of compliance, and more particularly to information technology (IT) management of information assets.

BACKGROUND OF THE INVENTION

Medium- to large-sized companies often have information technology (IT) infrastructure that is geographically distributed across multiple locations in different countries. Furthermore, this IT infrastructure may be divided into different zones of security, such as core enterprise zones with the highest security requirements, zones for development and test systems with lower security requirements, and perhaps areas like demilitarized zones (DMZs), where the systems hosting a company's web presence are located. Having operations that span multiple countries, such companies might need to comply with many different regulations applicable to the various information assets the company has. For example, sensitive information about customers and employees is governed by regulation in many countries.

An IT assets inventory system, change and configuration management database (CCMDB), or configuration management database (CMDB), is an IT repository that collects and stores information about IT assets known as configuration items (CIs), as well as descriptive relationships between those assets. CMDBs typically record three types of information about CIs: (i) technical attributes; (ii) ownership attributes; and (iii) relationship attributes. They may possess the ability to automatically discover information about CIs and to track changes to these assets over time as well. CMDBs help an organization track system configurations, understand the relationships (such as sources and dependencies) between the components of a system, and ensure that all changes are made using standardized and efficient methods, processes, and procedures that meet change objectives while minimizing detrimental impacts.

A metadata database, which may include a business glossary, provides a centralized location in an organization where enterprise business, technical, and operational metadata is stored, classified, and maintained. A typical metadata database stores terms and other business objects together with their associated semantics and relationships, including precise definitions, and allows only authorized individuals to make changes or access data elements with mandatory access control. Linked to the terms are logical and physical data models, as well as information about where they are deployed in operational systems such as databases. In addition, policies used to govern the IT assets linked to the terms through relationships between the terms and technical metadata may be part of a metadata database. Such a system promotes confident use of shared information and improved data governance throughout an organization by providing a consistent business context and meaning around IT assets, data, and business processes.

Security information and event management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures.

Information integration and governance (IIG) tools support data security and data privacy efforts by assuring the integrity of trusted data center information. They may include features for centralized controls for real-time data security and monitoring, fine-grained database auditing, automated compliance reporting, data-level access control, database vulnerability management, and auto-discovery of sensitive data.

SUMMARY

According to one aspect of the present disclosure, there is a computer program product, system and/or method which performs the following actions (not necessarily in the following order and not necessarily in serial sequence): (i) discovers a first piece of information about a new or changed information asset; (ii) determines, based at least in part on the first piece of information, a first characteristic of an ideal location for the information asset; (iii) determines, using a first locational schema, a first characteristic of a first location in an information technology environment; (iv) determines the compatibility of the information asset with the first location in an information technology environment by comparing the first characteristic of the ideal location to a first characteristic of the first location; and (v) reports the compatibility to a user.

DETAILED DESCRIPTION

Some embodiments of the present disclosure present a method to: (i) determine if the physical location of an information asset is compliant with pertinent security and information regulations; (ii) determine if an information asset is placed in the right infrastructure zone based on security and compliance requirements; (iii) provide advice to a user regarding the permissible locations for new information assets; (iv) track and organize placement locations based on attributes which can be discovered dynamically or imported through data sources external to a primary, asset-focused data source; (v) compute the right placement location for IT assets; (vi) consider asset placement constraints as contributors from a living asset metadata and network and topology model; and/or (vii) consider the implication of placement or asset change.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
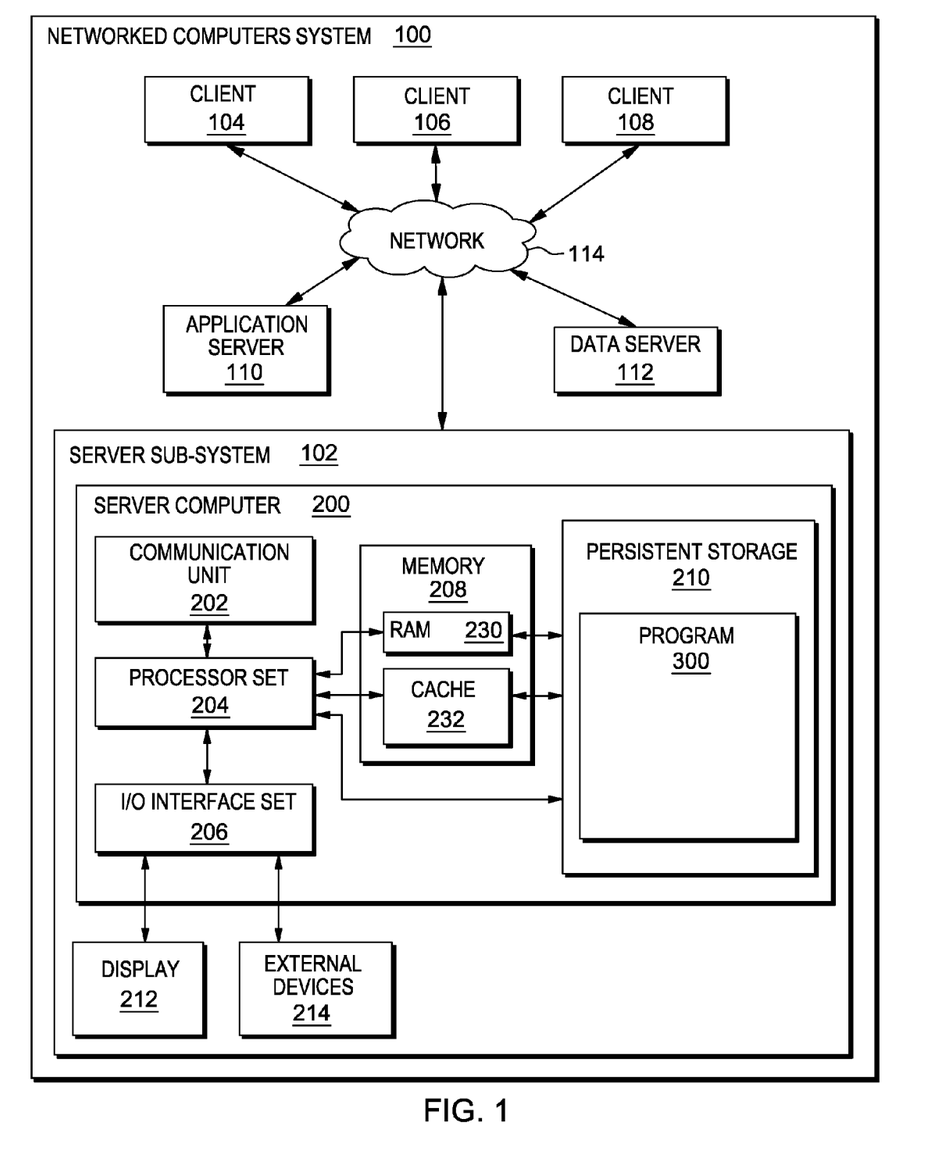
FIG. 1 is a schematic view of a first embodiment of a networked computers system according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, and 108; application server 110; data server 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. EXAMPLE EMBODIMENT

Figure 2:
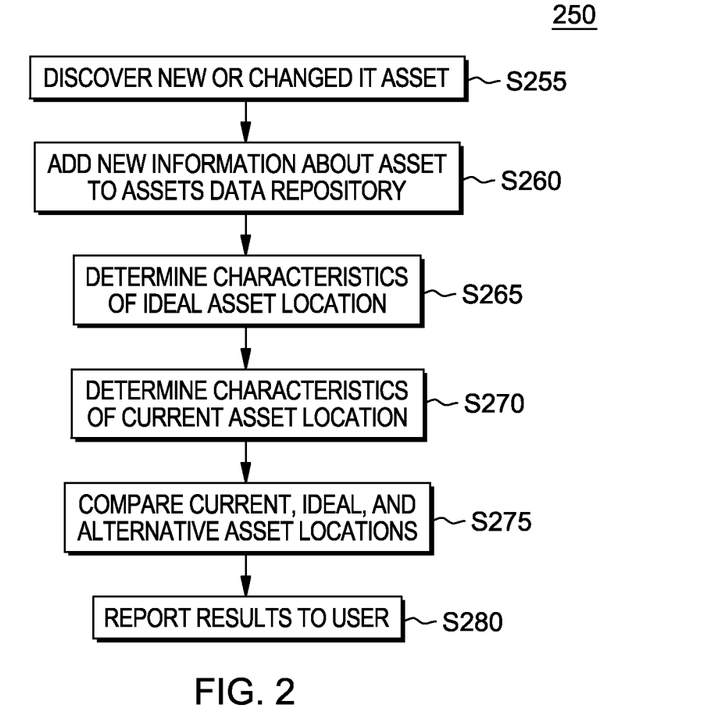
FIG. 2 is a flowchart showing a process performed, at least in part, by the first embodiment system.
Figure 3:
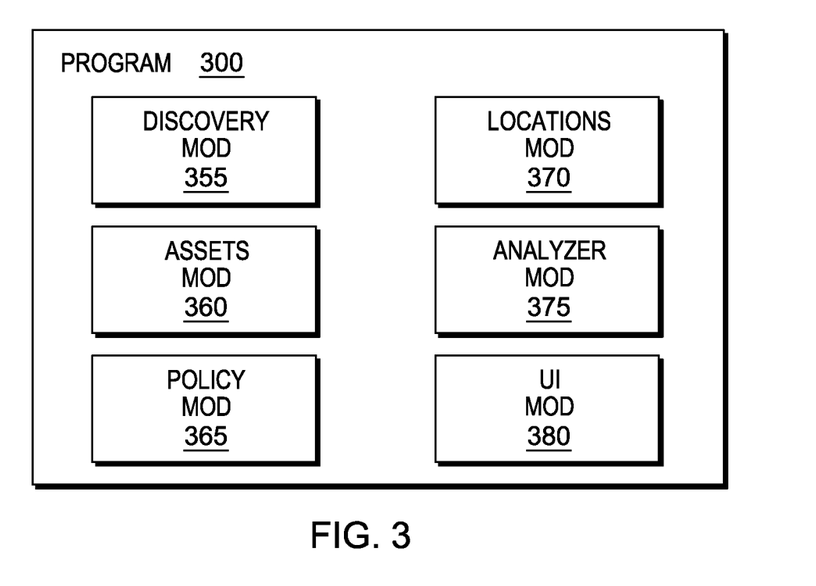
FIG. 3 is a schematic view of a portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where discovery module ("mod") 355 scans an IT network for new or changed assets.

The assets may be hardware assets such as server machines, routers, or storage devices; software assets such as firmware, virtual servers, operating systems, middleware software, encryption software, or office productivity applications; or data assets such as customer or employee information, business plans, financial reports, and so on. In general, the assets may be any type or combination of types of assets, fixed or mobile, now known or to be developed, that can be classified as IT assets and that are capable of being discovered and/or monitored by a computer system. New assets are assets for which a placement analysis has not been performed by program 300, while changed assets are assets that have changed since a prior analysis.

Discovery module 355 collects information about the new or changed assets, including properties such as asset name, type, version, network address, geographic location, time-in-service, and so on, as applicable and as available for that asset. It also collects information regarding the relationship of the new asset(s) to each other and/or to existing assets. For example, new operating system X may be discovered on existing virtual server Y, with a relationship that X runs on Y. In some cases, at least a portion of discovery and/or collection of certain information may be via manual entry by a user. In some embodiments, at least a portion of the information is collected by sampling a subset of data and/or networked assets rather than by an exhaustive search. In some cases independent discovery engines may be used, which can be mutually operational and run along the lines of different things being discovered—for example, logical network placement using IP network analysis versus contiguity and placement analysis.

Processing proceeds to step S260, where asset mod 360 adds or updates this information in an asset data store (not shown). The asset data store, accessed via asset mod 360, retains both current and historic information about discovered assets, which can be used in audits, risk management analyses, placement decisions, and so forth.

Processing proceeds to step S265, where policy mod 365 determines the characteristics of an ideal location for each new or changed asset. This assessment is based on information about or related to the asset as collected via discovery mod 355, as already existing in the asset data store accessed via asset mod 360, and/or as determined via policy mod 365. For example, suppose discovery mod 355 discovers a new asset and determines that this asset is a database containing sensitive economic information about countries that are members of the Association of Southeast Asian Nations (ASEAN) (this may be done using discoverable asset characteristics such as name, type, description, Internet Protocol (IP) address node geolocation attributes, and so on). This information is added to asset data store via asset mod 360. Policy mod 365 then determines that, because this is a sensitive asset concerning ASEAN countries, there is a requirement that it be physically located in an ASEAN country. It further determines that, because it will be accessed by external parties, it belongs in a medium security zone. In general, any number of factors may be considered, including intrinsic characteristics such as type of hardware, software, or data, and extrinsic qualities such as asset purpose, use levels, desired operating parameters, consequences of compromise, and applicable regulations, obligations, or organization policies. Moreover, other software modules, such as a metadata database, may play a supporting role.

Processing proceeds to step S270, where locations mod 370 determines the characteristics of the current location of each new or changed asset. It does this, in part, by maintaining location hierarchies and other information about locations and their relationships to each other. For example, using relationship information discovered by discovery mod 355 as well as information previously stored by asset mod 360, it determines this new database asset is located on a particular physical server, and that this physical server is in Jakarta. Locations mod 370 maintains (or has access to) geographical and other information associated with locations, so it can determine that Jakarta is in Indonesia, and that Indonesia is "in" ASEAN. It also determines that the network address of the server is part of a 24-bit sub-network (subnet), and that this subnet is part of the organization's e-commerce security zone. In some embodiments and for some assets, this step may be skipped because there is no current asset location; instead, the system is used prospectively to obtain a list of potential placement locations based on the characteristics determined in step S265.

Processing proceeds to step S275, where analyzer mod 375 determines the degree to which the current location of each new or changed asset is compatible with that asset. In the case of the new ASEAN database asset, analyzer mod 375 determines that the database is geographically situated in compliance with the requirement that it be in an ASEAN country, and also that it is part of the correct security zone. In other cases, it may determine that some characteristics of the asset location are less than ideal. In these cases, analyzer mod 375 will trigger locations mod 370 to perform one or more searches for possible alternative locations for the asset. For example, were analyzer mod 375 to deem the current location of the ASEAN database inadequate on both fronts, it would request locations mod 370 to search for other locations that are part of the organization's e-commerce or medium security zones and are geographically located in ASEAN countries. If none were found, analyzer mod 375 would request locations mod 370 to expand its search to look for locations where either of the two conditions are true. In some embodiments, this alternative search may not take place, it may take place only if the degree of incompatibility surpasses a threshold or upon user request, or it may take place even if the current location is found to be fully compatible. Compatibility may be assessed on a combined, weighted basis of all factors considered, or it may be assessed for each factor individually without combination.

Compatibility may not always be an either/or proposition, such as in the case of a single database for which some of the data is subject to one or more policies or requirements restricting the location where the data may be permissibly stored. In such a case, the degree of compatibility may be based, at least in part, on the ratio of the quantity of data stored compliantly to the total quantity of data to which the policies and/or requirements apply.

Processing proceeds to step S280, where user interface (UI) mod 380 presents the results to a user. Compatibility is assessed on a factor by factor basis and presented to the user as such. Alternatively, factors may be combined in some fashion, with only an overall assessment value being presented. In some embodiments, analyzer mod 375 determines the most preferred location based on a single, combined compatibility score, and suggests that to the user through the user interface. User interface mod 380 provides both a text and a graphic representation of the current location and its compatibility with each new or changed asset, as well as showing the compatibility of various alternative locations. A user can also use UI mod 380 to select the asset of interest or the details presented, set configuration parameters such as display mode, request a search for more alternative locations, or perform various other tasks associated with the placement of IT assets.

Here, the user sees that the ASEAN database asset has been acceptably placed, and decides no additional action is necessary.

As further illustration, suppose that sometime later discovery mod 355 discovers some change in the ASEAN database: say, that its average weekly load has surpassed some pre-configured threshold for a period of so many days. Discovery mod reports this change to assets mod 360, and policy mod in turn finds a policy stating that assets experiencing such a load should be located on a Fibre Channel network. Location mod 370 determines that the current location of ASEAN database is not in such a location, while analyzer mod 375 determines that there are two existing locations that meet this requirement while also meeting the other two existing requirements for the ASEAN database, which remain unchanged. These results are reported to the user via UI mod 380. UI mod 380 uses a different graphical indicator for displaying compatibility of each location with each factor—color for security zone, shape for physical location, and shading for network type. Alternatively, other graphical indicators could be used, such as size or position on the screen; filtering could be applied so that a user can focus only on a subset of requirements at a time; only overall compatibility could be indicated graphically; and/or text indicators could be provided, to name a few alternatives. Through the process detailed above, the system: (i) alerts the user to IT infrastructure changes that possibly require further attention; (ii) helps the user assess the specifics of the situation; and (iii) helps the user determine possible alternatives.

Figure 4:
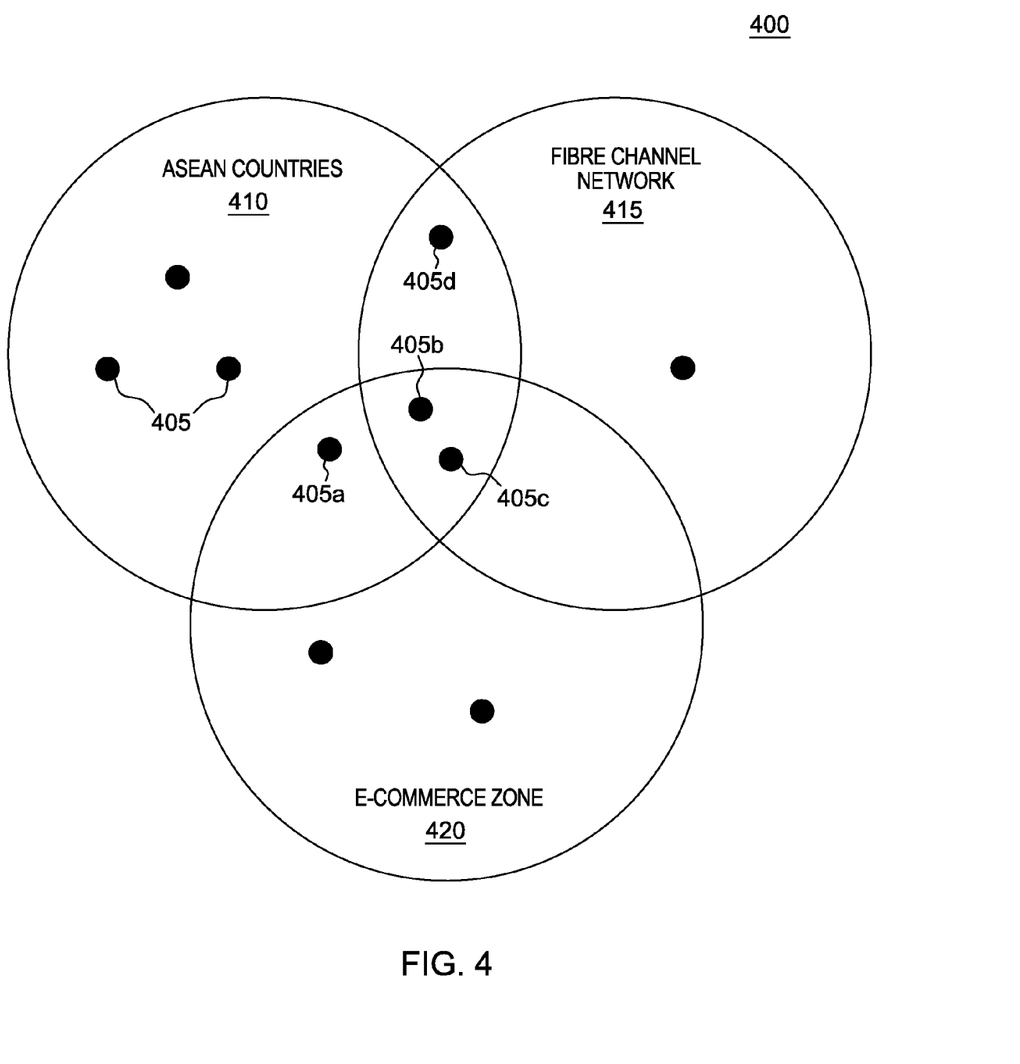
FIG. 4 is a diagrammatic view of a portion of the first embodiment system.

This situation is depicted visually in FIG. 4. FIG. 4 shows diagram 400, representing a simplified view of part of networked computers system 100 (see FIG. 1). Each of locations 405 represents a location in the network where the ASEAN database asset discussed above may be placed, organized according to the three factors of interest above. For example, seven locations in the diagram are located in an ASEAN country (ASEAN countries 410). Five locations are located in e-commerce zone 420. However, only three locations —405a, 405b, and 405c—are both located in an ASEAN country and are in an e-commerce zone. Location 405a is the original, fully compliant location of the ASEAN database. When the changed load statistic is reported and the Fibre Channel policy found to apply, the system discovers that location 405a is not compliant with this policy, but finds four alternate locations that are on a Fibre Channel network (415). Two of these, 405b and 405c, are compliant with both this and the pre-existing requirements for the ASEAN database location. Note that this is a current snapshot of the location landscape as maintained by locations mod 370—for instance, locations 405b and 405c may or may not have existed at the time the ASEAN database was originally added. Also note that, had 405b and 405c not been found, the system may have presented location 405d as a possible alternative because, while not meeting every requirement, it is the only location found besides 405a that meets two of the three, and is therefore likely to be an alternate location candidate worthy of user assessment.

III. FURTHER COMMENTS AND/OR EMBODIMENTS

Some embodiments of the present disclosure recognize the following facts, potential problems and/or potential areas for improvement with respect to the current state of the art: (i) it can be difficult to determine the proper placement of new information assets in the IT infrastructure because there is no method or tooling available computing permissible locations compliant with regulatory requirements (for instance, where legislation prevents the relocation of employee or customer information outside a country or region); (ii) the type of the information asset may restrict the computing zone (higher or lower security standards) into which such an asset may be placed, but again there is no method or tooling available to determine the appropriate location of an information asset with regard to its security requirements; (iii) there is no method or tooling available to provide notification when an information asset requires relocation due to either increased security requirements or changed regulations; (iv) the organizational structure of locational placement can be based on completely disjoint criteria—for scalability and rapidity of asset or network management solution deployment, the structure is often determined using some form of auto-discovery of all or some subset of assets, but the criteria for the organization of assets in the auto-discovered structure should support operational refinement and evolution over time, because the "picture" developed for locational structure alone is often incomplete at the time of discovery; and/or (v) federation of security and information availability means zone-based designations (such as geographic zones like countries) may not be mutually exclusive, but may have network presence which can be proxied or have differing security filtering to meet regulatory requirements on a distributed scale.

Some embodiments of the present disclosure recognize that, for the above reasons: (i) information assets are not always placed where they should be; (ii) there is an incomplete view of the nature of information assets with respect to security and regulatory requirements; and/or (iii) manual efforts to manage information assets with respect to security and regulatory requirements are error prone and time consuming.

Some embodiments of the present disclosure recognize that, while some CCMDBs store landscape information about IT assets, such systems only possess a partial view of the information required to determine the ideal placement of IT assets. Similarly, their auto-discovery engines have limited, if any, capability with respect to locational containment or inferencing (some of the various domains on a global network might have greater transparency, richness of attribute data, and discovery capabilities than other domains on the network, for example). Likewise, while some business glossaries store business-related information for information assets, such systems have only part of the information required to determine the ideal placement of those assets in the IT infrastructure.

Further, they recognize that some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Still further, they recognize that some IIG systems can scan a network and discover database servers and, if given credentials, can scan a database and use heuristics and regular expressions to determine if there is sensitive data stored therein. They can then look at generic policies that should be applicable. However, they have no notion of location, whether geographic or in terms of network zones.

Some embodiments of the present disclosure include an information asset placer that is implemented entirely in software, or in a combination of software and hardware. In some embodiments where the information asset placer is built entirely in software, it can also be added as a component to existing software.

In some embodiments of the present disclosure, the information asset placer possesses the following characteristics, functions, and/or abilities:

(i) acquisition of assets, such as elements of hardware, software processes, or significant data storage, via (a) dynamic discovery, (b) entry though an administrative user interface, and/or (c) importation through some foreign data source, such as a catalog service interface from an external asset management system;

(ii) a user interface for a user to perform functions such as entering or refining the attributes of an information asset, classifying its specific application type, and identifying applicable regulations, preferred deployment platforms (operating system, database, application server, and so forth) and security zone classification;

(iii) base location relationships that are created as part of the framework for the deployment of the system under a policy for location creation, placement, and creation of location hierarchies which will constitute the building blocks of asset placement decisions;

(iv) base location relationships that regard factors such as physical geography, network placement, and/or broad vicinity/group containment notions in governing conformance schemes;

(v) the ability to place assets in locational containers that represent the union or intersection of equivalence classes of one or more classification hierarchies—for example, an asset might be placed in "northern United Kingdom" and in subnet "76.112.0.0/16";

(vi) in addition to being able to access the location policies and relationships of (iii) and (iv), the ability to interface with CCMDB, business glossary, and other such systems to read necessary information regarding details on regulations, security zones, and the like (over the course of an asset's life cycle, this ability provides data to be considered during discovery or reconciliations from asset moves/adds/changes, providing the asset-lifetime aspect of the system and the operational value gained from it);

(vii) identification of possible placement locations based on the influencing parameters derived from the security and regulatory requirements that apply to an asset;

(viii) visualization for the user of the locations of (vii) with maps of the IT landscape coloring areas where the information asset may be permissibly placed (the base(s) of which were derived from the locational creation in (iii)), whereby the user can the select a location in cases where multiple placement location options are available;

(ix) for existing information assets registered with the solution, the ability to create alerts notifying users if changes in security requirements and/or regulations require a relocation of an information asset, along with suggestions for the new location;

(x) for initial deployment of the solution, a bulk processing method allowing the importation of all IT assets registered in systems like a CCMDB;

(xi) the ability to access additional information sources like a business glossary in order to correlate existing IT assets with their applicable regulations;

(xii) the ability to process information assets to determine whether or not their current locations are acceptable; and/or (xiii) the ability to process information assets to determine where they should be placed.

Some embodiments of the present disclosure may include one, or more, of the following features, characteristics and/or advantages: (i) improved compliance of IT assets with respect to their geographic location; (ii) improved security, because more sensitive assets will be placed in areas with higher security; (iii) reduced manual work figuring out where IT assets should be located; and/or (iv) unification of the discovery of assets, their locations, and moves and changes to those asset placements, together with the regulatory and compliance aspects of those asset placements and changes.

Figure 5:
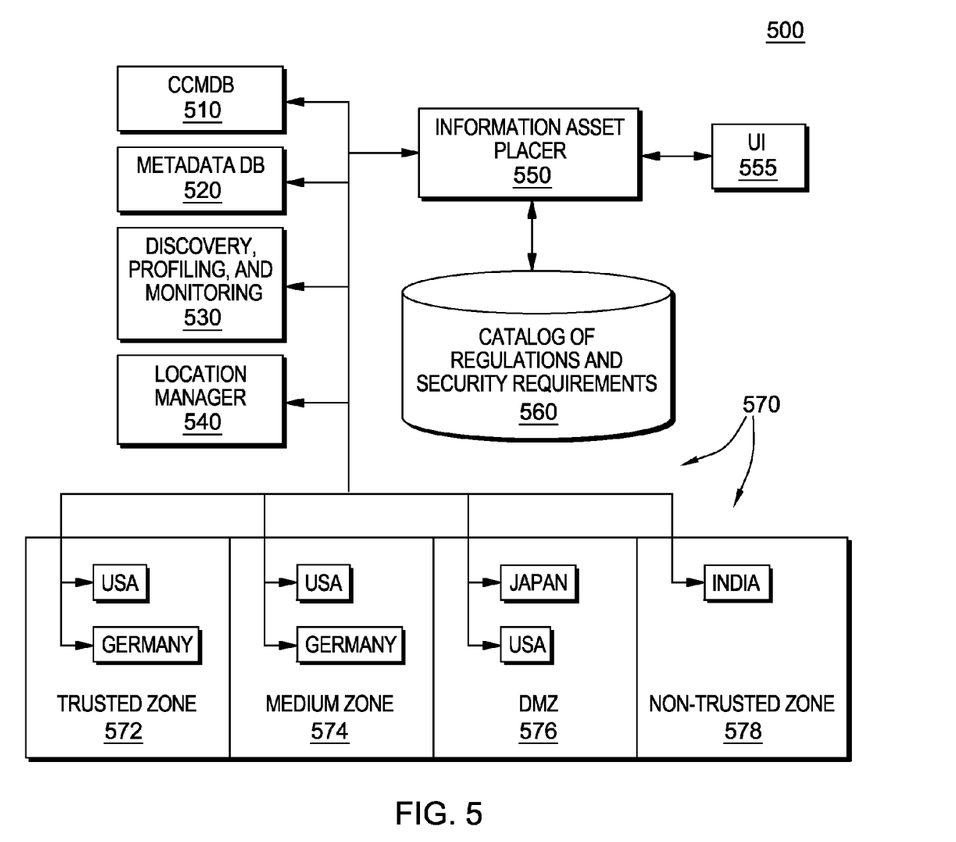
FIG. 5 is a schematic view of a second embodiment system.

Shown in FIG. 5 is system 500, an example embodiment of an asset placement solution architecture for an information asset placer system. System 500 includes: CCMDB 510; metadata database 520; discovery, profiling, and monitoring component 530; asset location manager and analyzer (location manager) 540; information asset placer 550; user interface 555; catalog of regulations and security requirements 560; and IT infrastructure (IT environment) 570, containing four security zones, with each zone containing one or more distinct geographic locations within it. The zones of IT infrastructure 570 are: trusted zone 572, where mission-critical corporate systems should be located, medium zone 574, for hosting non-core applications, demilitarized zone 576, for e-commerce solutions, and non-trusted zone 578, where development and test processes may take place.

CCMDB 510 provides an inventory of the IT systems in an enterprise in order to perform tasks like configuration and change management. It feeds information asset placer 550 with move/add/change (MAC) events for IT assets throughout their life cycles. CCMDB 510 has crawler/spider algorithms that scan the IT environment for new systems as well as detect upgrades or changes to the software footprints of existing systems. CCMDB 510 seeds the framework from which location manager 540 develops its base model (see below).

Each asset tracked in CCMDB 510 is represented by a configuration item (CI). A CI's properties include values such as asset name, hostname/IP address, location, type of system, software version, CPU numbers, and other such information. A CI also contains information about how the asset correlates with other assets. For example, a business system providing the function of corporate email might be composed of a set of IT assets that includes a business system (name=Corporate Email) which contains a computer system (name=EmailServer1, mem=4 GB, # CPUs=2); an operating system (name=OpSys1, ver=3.13) that is installedOn and runsOn this computer system; an application server that runsOn this operating system, an application that is deployedTo this application server and that uses some database server (name=DBServer1); and so on. This is a brief example of the types of attributes each CI could contain and the ways in which CIs could be related.

Metadata database 520 contains business, technical, and operational metadata. Business metadata, such as a classification of business terms and their definitions as they relate to information processed within a company, is stored in metadata database 520. On the next level, business objects and logical data models can be associated with the business terms as well as additional information on the business object, such as applicable regulations. On the next level, physical table definitions can be attached to the logical data models and the name/type of system where these tables and models are actually implemented. For instance, for a business object like "customer", there might be multiple table definitions for several systems in an enterprise that process customer information.

Discovery, profiling and monitoring component 530 provides capabilities to discover data models within a system, and mappings between models in the same or different systems. If a model is identified to hold sensitive information in one system and a similar looking model is found in another system which has not yet been classified, this could be a first indication that this other system might hold sensitive information as well. Another set of capabilities provided by this component are data profiling and data quality monitoring functions. In the context of this disclosure, the intent is usually not to do full data profiling and data quality monitoring across all of the data stored in the various IT systems, but rather to perform a data sampling to identify whether or not new tables (or existing tables) contain sensitive information. For example, it is relatively easy to set up rules for data profiling to detect if the values in a field follow typical patterns such as those found with: (i) social security numbers (SSN); (ii) tax IDs; (iii) credit card numbers; demographic information such as gender, age, religion, marital status, and the like; and/or (iv) address information. If, for instance, address information is discovered, an analysis can be done against country reference data sets to determine to which country the address belongs (and, in turn, which privacy and security regulations may apply).

By regularly performing this type of monitoring on data samples in various systems, it is possible to detect if existing systems have been modified or new systems have been added to hold sensitive information. This component knows about all tables in all systems via the metadata managed by metadata database 520. Also, if the tables are linked to business metadata indicating that a table supposedly has sensitive or only non-sensitive information, this component can place notifications to the authoring user interface of metadata database 520 whether or not the business metadata is accurate in this respect.

Catalog of regulations and security requirements 560 includes a reference catalog of regulations, which can import/export regulations expressed in policies that can be enforced. This catalog includes information about whether or not stored information assets are permitted to be physically moved across country borders. For example, some countries in Europe do not permit personal information to be moved outside of the home country of the person to which the information pertains, or permit such a move only with the explicit written permission of the information owner. Catalog 560 also has, out-of-the-box, a complete catalog of security capabilities linked up to security requirements so that information asset placer 550 can query them and a user can select which ones should be enforced and are applicable in which trust zone of IT environment 570. Catalog 560 has geographic locations for the IT buildings and trust zone classifications available as well.

Figure 6:
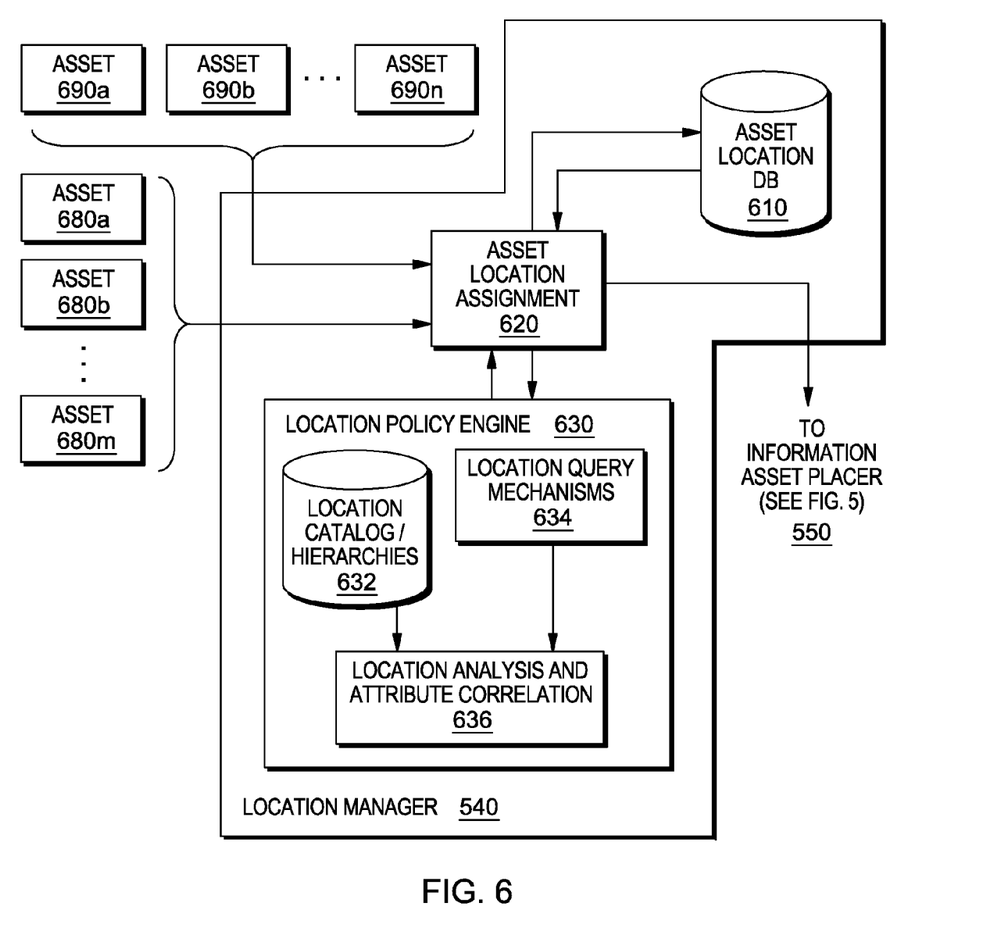
FIG. 6 is a schematic view of a portion of the second embodiment system.

Turning momentarily to FIG. 6, the solution architecture for location manager 540 can be seen. Location manager 540 includes: asset location database 610; asset location assignment engine 620; and location policy engine 630, which contains catalog of locational and location grouping/relationship attributes and management policy (location catalog/hierarchies) 632, along with location query mechanisms 634 and location analysis and attribute correleation 636. FIG. 6 also shows IT assets 680a through 680m and IT assets 690a through 690n.

Location catalog/hierarchies 632 seeds the base schema for locations. This schema is the building block of the locational assignment of assets individually or in aggregate. The specifications contained in location catalog/hierarchies 632 include the locations themselves and the locational schema(s), along with certain points for location manager 540 operations with respect to the management of those locations or the assets being placed into them (see below).

The locations themselves can be individually entered or obtained through an external data source query of discrete location levels; they can also be assigned as broad references to other schemas, such as by continent/country/major city/designated marketing area (DMA), all public and/or private IP networks by specified prefix length (such as /24, or 24-bit), domain name server (DNS) name (domain name) by matching regular expressions, or any other method of assignment supported by the system.

Each location or location grouping has assigned mechanisms to determine asset placement to that containment level. For example, assets for a given location or grouping may be matched by results from a Simple Network Management Protocol (SNMP) sysLocation query or a procedure to query on asset data or a proxy network manager. They may also be matched in other ways, such as via attributes capable of being queried for location from a Representational State Transfer (REST) application programming interface (API) call to an asset agent, then using the API of a map application to map that attribute to an exact location. Raw geographic data could come from a geolocation sensor on the chassis of a device, for example, which could then be converted to a map-topological look from a map API lookup seeded from that geolocation data. Knowing the physical location of an asset can pinpoint, say, which specific data center (or data center area) the assets are in (or should be in). Mapping APIs can be used for visual presentation of this information to a user. These mechanisms can be specified at the "root" level for inheritance to all other points along that catalog hierarchy.

While some locational schema may have semantically clear relationships based on the schema (for instance, "Los Angeles", "Portland", and "Seattle" all resolve to a higher containment of "Western United States"), others may require that the relationships be established to a non-obvious higher-level containment factor, particularly when the containment level is specified in a solution-deployment-specific way (for example, all longitude/latitude values matching a criteria map resolve to a containment of "Central Management Zone" for, say, the management of physical infrastructure such as a smart electricity grid).

Finally, the thresholds and predispositions for decomposition/elaboration into a "nested" level can be specified for points in the catalog hierarchy, either by direct attribute or by threshold, such as "once more than 10 assets have been identified in this /16 subnet, do automatic breakdown into contained /24 sub-networks for scalability" (hereinafter referred to as "Example Rule 1").

Location manager 540 determines the containment, at the placement/location level, into which assets are placed when they are discovered or introduced into the system. It is geared around automation of placement into locational containers, and the automated decomposition and aggregation of those containers by hierarchical relationships between containment levels. The structure, instance identification, and rules for the decomposition and other evolutionary processes on these locational containment instances and their boundaries are contributed by location catalog/hierarchies 632 component discussed above.

The locational containment relationships (multiple, because they may be multi-valued per asset or class of assets) as realized through location manager 540 can seed a map or other similarly depicted user interface for aggregate viewing of assets, their locations, and their current and past placements.

Where an asset (whether by tag, serial number, data signature, or the like) can be determined to have "changed" location, through the moves-and-changes portion of an asset discovery piece such as that of CCMDB 510 (see FIG. 5) as discussed above, or simply through the explicit change in administrative asset data or the values obtained from an imported asset database, that change triggers locational analysis in the location manager. It is "reintroduced" into the location containment model, but with traceability as to its prior point of containment. This provides an important trigger for the coupled information asset placer 550 for its own placement analysis (see below), along with the context for any placement decision alerts.

FIG. 6 depicts the functioning of this portion of system 500. Assets 680a through 680m are newly discovered. Assets 690a through 690n are to be reconciled because their locations have changed. This information feeds into asset location assignment component 620 of location manager 540, whose assignments are informed by queries for locational hierarchy information via location policy engine 630 based on available location information, if any, associated with the assets. The new assignments are stored in asset location database 610, which also informs aggregation/decomposition requests and decisions (such as Example Rule 1, above). If a schema creation or update is triggered (such as by meeting the antecedent of the aggregation/decomposition action as specified in Example Rule 1 and its logical inverse), location catalog/hierarchies 632 of location policy engine 630 is updated accordingly. Finally, the new asset information triggers analysis by information asset placer 550 (see below).

Returning to FIG. 5, for each known asset in IT environment 570 captured in CCMDB 510, information asset placer 550 determines where within IT environment 570 the asset should be placed. When making this determination, information asset placer 550 considers the following factors: (i) geographic location; (ii) trust zone; (iii) security requirements; (iv) regulatory requirements; (v) data sensitivity results as determined by discovery, profiling and monitoring component 530; and (vi) metadata from metadata database 520. The metadata from metadata database 520 includes information assets resulting from linking models and the assets they contain (or that contain them) to terms, along with information about the security and regulatory policies (and other policies) attached to those assets.

Figure 7:
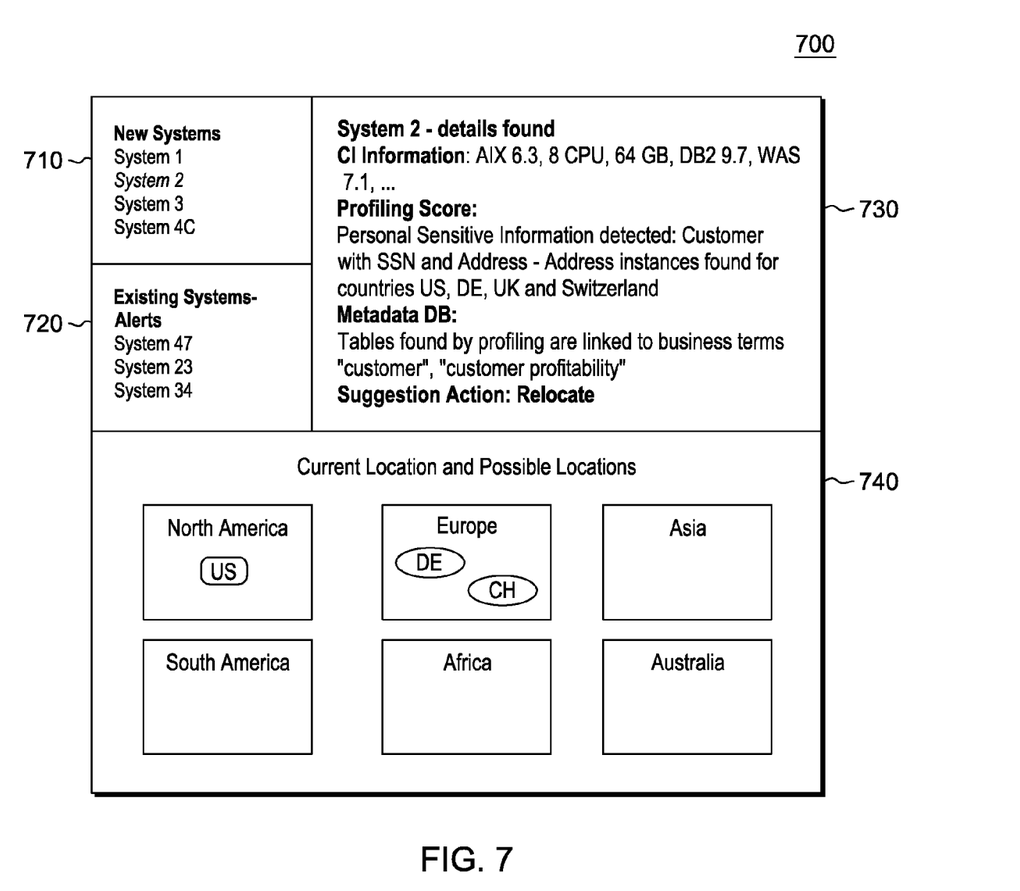
FIG. 7 is a screenshot generated by the second embodiment system.

Shown in FIG. 7 is screenshot 700, illustrating some of the capabilities of user interface (UI) 555 of information asset placer 550. Screenshot 700 includes: new systems bucket 710; existing systems bucket 720; details canvas 730; and locations pane 740. If CCMDB 510 (see FIG. 5) detects a new system, a "To Do" item appears in new systems bucket 710. If a change is detected, such as a change of the system stack detected by CCMDB 510 or a change of the data sensitivity status found by discovery, profiling and monitoring component 530, an alert is created in existing systems bucket 720. For each "To Do" item as well as for each alert, a user can open up the details for the system and see all relevant information in details canvas 730. Finally, locations pane 740 shows a user the current location of the selected system as well as other possible locations for the system. By using different shapes for current location (square) and possible locations (circles) as well as color codes indicating if the current location is OK (green) or not OK (red), it is easy for the user to understand if the selected system is placed in a compliant fashion or not (note: if FIG. 7 were in color, the box labeled "US" in locations pane 740 would be red, while those labeled "DE" and "CH" would be green).

UI 555 also has additional capabilities that are not shown in screenshot 700. These include the ability to set configuration options for information asset placer 550, including: (i) whether or not to automatically trigger discovery and profiling if CCMDB 510 finds a new system; (ii) whether or not to automatically trigger profiling if CCMDB 510 detects an upgrade; and (iii) whether a single monitoring frequency is to be used for all systems or set on a per system basis. Through UI 555, a user can also perform such tasks as requesting ad-hoc profiling activity, setting monitoring frequency and "depth" (that is, size of data, types of tests, and so on), reviewing regulations and attaching/detaching them from the system, and reviewing security policies and attaching/detaching them from the system.

Figure 8:
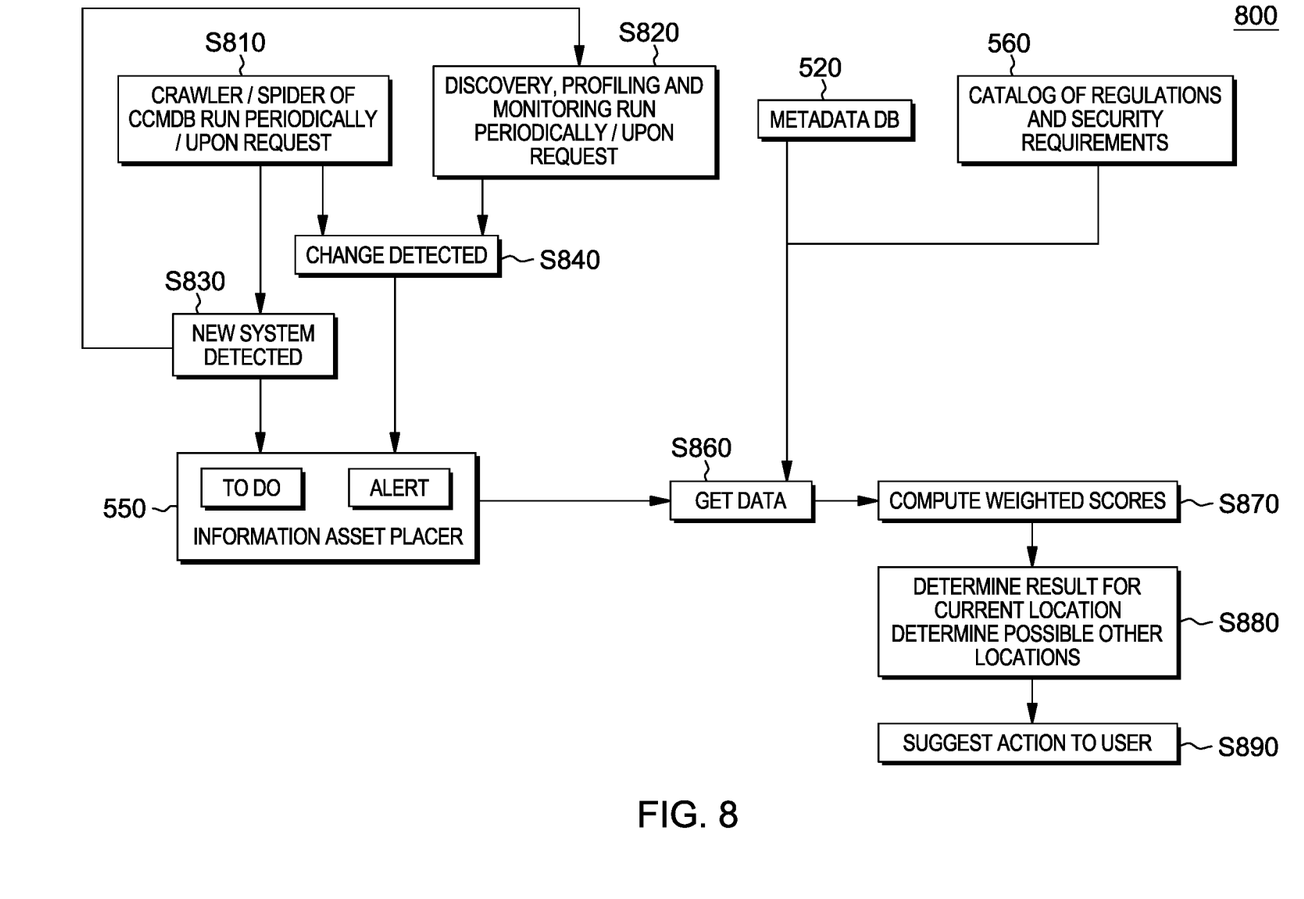
FIG. 8 is a flowchart representing a process performed, at least in part, by the second embodiment system.

Shown in FIG. 8 is algorithm framework 800 supporting information asset placer 550. In step S810, the exploration component of CCMDB 510 (see FIG. 5) runs periodically or on request to determine whether there are any new or changed IT assets in IT environment 570. Discovery, profiling, and monitoring component 530 is also run periodically or on request (step S820) to profile any associated data models and the data they contain. If a new IT asset is detected (step S830), the item is added to the "To Do" list of information asset placer 550 and discovery, profiling, and monitoring component 530 is triggered to run against the newly discovered asset(s). If a change is detected to an existing IT asset by either CCMDB 510 or discovery, profiling, and monitoring component 530 (step S840), an alert is generated for that asset in information asset placer 550. Data related to the new or changed IT asset(s) is then collected in step S860 from all the various information sources, including metadata database 520 and catalog of regulations and security requirements 560.

A number of key performance indicators (KPIs) are computed from this data in step S870. These KPIs include a sensitivity KPI (S-KPI), which measures if the data found is or is not sensitive. Sensitive data fields are fields like social security numbers, credit card numbers, and so on which often need special protection, such as being stored only in an encrypted fashion or requiring higher privileges to access. The S-KPI measures how many rows provide a value for the field and how many are stored with the special protections they require (like whether they are stored in an encrypted or a non-encrypted fashion). The S-KPI is not a 0/1 score, because the profiling is done on a data sample and perhaps only some fraction of the data is found to be compliant. For example, a particular column of data fields containing sensitive data, such as social security numbers, may have been found compliant for only 40% of the values sampled.

Other KPIs include: (i) a regulation KPI (R-KPI), which provides an indication of the potential legal and business risks associated with any regulatory non-compliance detected (the risk factor can be configured by the user); (ii) a security KPI (Sec-KPI), which scores any security policies associated with the system to provide insight regarding in which trust zone a system should be placed (trusted zone, DMZ, non-trusted zone, and so forth); and (iii) a metadata KPI (M-KPI), which determines how relevant and accurate the metadata found in metadata database 520 is for classification of the system (one factor considered is if a sensitive attribute is found in metadata database 520 for a table in the system for which the latest profiling results have contradicting information, the metadata is flagged as being outdated). In various alternative embodiments, other KPIs may be computed instead of, or in addition to, the four KPIs described here.

Once all the KPIs are determined, they are accumulated to a total score using weights which are configurable by the user. The attributes governing sensitivity, regulatory considerations, security attributes, and metadata for the asset placement decisions can be seen as joined data overlays on the part of the locations as exposed and processed through asset location manager and analyzer 540 itself. This is to say, these attributes are not intrinsic to the core definition of the location itself, but are part of the usage of those locations in the applications driving the KPI determinations. Location manager 540 doesn't inherently incorporate all of the attributes of locational interest or the semantics for all possible stakeholder applications (such as the specific regulatory attributes found in catalog of regulations and security requirements 560 used by information asset placer 550) into its data model. Rather, a model joining the core location attributes and those for each realm of asset regulatory sensitivity, security concern, and so on is used (though in some embodiments, all of these attributes may be incorporated into the location manager component).

The KPIs and total score are then used to make asset location decisions/suggestions in steps S880 and S890 as follows. First, a result for the current location of the system is determined. For instance, the current geographic location of the system and/or its network location (both of which are intrinsic location attributes if maintained) are compared against the profile of the trust zone it should be in considering the S-KPI and Sec-KPI results. If any mismatch is found the system is marked as being placed in the wrong location.

Second, a determination of possible new locations is made based on details of the KPIs, such as the S-KPI and Sec-KPI, and information available in catalog of regulations 560. If no location is found which is completely compliant, one or more of the "closest" matches are presented. Influencing factors and the rule system used include: (i) if addresses are found from countries for which data privacy regulations demand data to be within the country (unless written permission to move it elsewhere has been obtained from the information owner)—these countries are put onto a candidate list of potential new locations for the asset; (ii) the candidate list then is compared to the company's IT locations, and any country on the candidate list for which the company does not have an IT location is removed from the list; and (iii) (a) IT locations are scanned for available trust zones, where the zones map to single locations or an aggregation of multiple locations as tracked and processed by asset location manager 540, (b) the available trust zones at an IT location for a country on the candidate list are then compared to the trust zone level required by the system being classified, and (c) if a trust zone level appropriate for the system being placed is found, that trust zone at the IT location in that country on the candidate list is flagged as a possible location. Other factors and rules may be included in other embodiments.

Some embodiments of the present disclosure recognize that the final judgment about where an IT asset should be placed is usually a human decision. Therefore, these embodiments will typically be used as smart advisor tools for an IT manager/architect/administrator. For example, an analysis may be required to re-implement a master data management (MDM) solution with a federated architecture and appropriate filters on the services layer across multiple databases physically located in the countries where data privacy regulations demand the data to be physically stored. Alerting a user to the possibility that their data may be subject to such regulations and providing an indication of the legal and/or business costs associated with non-compliance can motivate the user to take appropriate action and can provide support for any resulting decision. This decision, along with documentation of the reasoning behind it, can be attached to the information asset placer system in some embodiments of the present disclosure. These embodiments therefore not only help to manage compliance and security better, but also make decisions in this regard more transparent and auditable.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Information asset, information technology (IT) asset: any tangible or intangible asset related to data, information, or information technology; such assets include but are not necessarily limited to elements of hardware, software, process, or data storage.

What is claimed is:

1. A method for placement of information assets within an information technology (IT) environment, the method comprising:

discovering, via a networked IT infrastructure of the IT environment, a first piece of information about an information asset within the IT environment;

determining, based at least in part on the first piece of information, a first characteristic of an ideal location for the information asset;

determining, using a first locational schema for IT environment locations, a first characteristic of a first location in the IT environment;

determining compatibility of the information asset with the first location by comparing the first characteristic of the ideal location to the first characteristic of the first location;

reporting the compatibility to a user;

determining, using the first locational schema, compatibility of the information asset with a second location in the IT environment; and suggesting, based at least in part on the determined compatibilities, a placement of the information asset as between the first and second locations;

wherein:

at least the determination of the compatibility between the information asset and the first location is performed by computer software running on computer hardware.

2. The method of claim 1 wherein the first characteristic of the ideal location is physical location and is derived from government regulations.

3. The method of claim 1 wherein the first characteristic of the first location is a network security zone.

4. The method of claim 1 wherein alternative locations are displayed with a graphical indication of their respective compatibility with the information asset.

5. The method of claim 1 further comprising:

importing a plurality of information assets from a configuration database in an initial registration operation;

wherein:

the configuration database contains configuration data on information assets and applicable policies.

6. The method of claim 1 further comprising:

maintaining current and historic information about placement of the information asset for audit purposes.

* * * * *